(12) United States Patent
Walsh (10) Patent No.: US 11,149,386 B2
(45) Date of Patent: Oct. 19, 2021

(54) MULTI-AXIAL GRID OR MESH STRUCTURES WITH HIGH ASPECT RATIO RIBS

(71) Applicant: TENSAR TECHNOLOGIES LIMITED, Blackburn (GB)

(72) Inventor: Anthony T. Walsh, Lancashire (GB)

(73) Assignee: TENSAR TECHNOLOGIES LIMITED, Blackburn (GB)

( * ) Notice: Subject to any disclaimer, the term of this patent is extended or adjusted under 35 U.S.C. 154(b) by 0 days.

(21) Appl. No.: 16/668,067

(22) Filed: Oct. 30, 2019

(65) Prior Publication Data

US 2020/0173118 A1    Jun. 4, 2020

Related U.S. Application Data

(63) Continuation of application No. 16/022,132, filed on Jun. 28, 2018, now Pat. No. 10,501,896, which is a
(Continued)

(51) Int. Cl.
*B32B 3/10* (2006.01)
*E01C 11/16* (2006.01)
(Continued)

(52) U.S. Cl.
CPC .............. *E01C 11/16* (2013.01); *B29C 55/14* (2013.01); *B29C 55/143* (2013.01); *B29D 28/00* (2013.01);
(Continued)

(58) Field of Classification Search
CPC ............. B29D 28/00; Y10T 428/24273; Y10T 428/26; E02D 3/005; B29C 55/14; B29C 48/13; B29C 55/143; B29C 48/05; B29C 55/12; D04H 3/04; D04H 3/045; E01C 11/16; E01C 3/006; B32B 5/028; B32B 2250/20; B32B 5/12; D03D 9/00; E02B 3/122
See application file for complete search history.

(56) References Cited

U.S. PATENT DOCUMENTS 3,252,181 A   5/1966   Hureau
3,317,951 A   5/1967   Hureau
(Continued)

FOREIGN PATENT DOCUMENTS

EP   0837191   4/1998
GB   1210354   10/1970
(Continued)

*Primary Examiner* — Carib A Oquendo
(74) *Attorney, Agent, or Firm* — Jacobson Holman PLLC (57) ABSTRACT

A multi-axial geogrid possesses a series of interconnected strands or ribs that are arranged along at least two different axes within the plane of the structure. The strands or ribs have an aspect ratio, defined as the ratio of the thickness to width, of greater than 1.0, thickness being the direction normal to the plane of the structure. The geogrid can be manufactured by modifying the process parameters in order to create high aspect ratio ribs, using any of the various known methods for producing geogrids. A reinforced civil engineering structure, and method therefor, is formed by embedding in soil one or more horizontal layers of geogrid having high aspect ratio ribs. The reinforced structure shows improved rutting performance when subjected to vehicular traffic.

21 Claims, 7 Drawing Sheets

Related U.S. Application Data continuation of application No. 15/418,135, filed on Jan. 27, 2017, now Pat. No. 10,024,002, which is a continuation of application No. 13/618,625, filed on Sep. 14, 2012, now Pat. No. 9,556,580, which is a continuation of application No. 12/379,058, filed on Feb. 11, 2009, now abandoned.

(60) Provisional application No. 61/064,102, filed on Feb. 15, 2008.

(51) Int. Cl.

| | | |
|---|---|---|
| *B29C 55/14* | (2006.01) | |
| *B29D 28/00* | (2006.01) | |
| *D04H 3/04* | (2012.01) | |
| *E02D 17/20* | (2006.01) | |
| *E02D 3/00* | (2006.01) | |
| *B32B 5/02* | (2006.01) | |
| *B32B 5/12* | (2006.01) | |
| *D03D 9/00* | (2006.01) | |
| *D04H 3/045* | (2012.01) | |

(52) U.S. Cl.
CPC ............ *B32B 5/028* (2013.01); *B32B 5/12* (2013.01); *D03D 9/00* (2013.01); *D04H 3/04* (2013.01); *D04H 3/045* (2013.01); *E02D 3/005* (2013.01); *E02D 17/202* (2013.01); *B29K 2995/0053* (2013.01); *B32B 2250/20* (2013.01); *B32B 2262/02* (2013.01); *B32B 2459/00* (2013.01); *D10B 2505/204* (2013.01); *Y10T 428/24273* (2015.01); *Y10T 428/24298* (2015.01)

(56) References Cited

U.S. PATENT DOCUMENTS

| | | |
|---|---|---|
| 3,386,876 A | 6/1968 | Wyckoff |
| 3,496,965 A | 2/1970 | Hureau |
| 4,140,826 A | 2/1979 | Liu |
| 4,303,714 A | 12/1981 | Mercer |
| 4,374,798 A | 2/1983 | Mercer |
| 4,470,942 A | 9/1984 | Beretta |
| 4,590,029 A | 5/1986 | Mercer |
| 4,662,946 A | 5/1987 | Mercer |
| 4,743,486 A | 5/1988 | Mercer et al. |
| 4,756,946 A | 7/1988 | Mercer |
| 4,808,358 A | 2/1989 | Beretta |
| 5,053,264 A | 10/1991 | Beretta |
| 5,156,495 A | 10/1992 | Mercer |
| 5,419,659 A | 5/1995 | Mercer |
| 5,851,089 A | 12/1998 | Beretta |
| 7,001,112 B2 | 2/2006 | Walsh |
| 8,109,696 B2 | 2/2012 | Maggioni |
| 2004/0062615 A1 | 4/2004 | Walsh |
| 2009/0214821 A1 | 8/2009 | Walsh |

FOREIGN PATENT DOCUMENTS

| | | |
|---|---|---|
| GB | 2255292 | 11/1992 |
| JP | 2002061193 | 2/2002 |
| JP | 2007262879 | 10/2007 |
| WO | WO2007/095979 | 8/2007 |

MULTI-AXIAL GRID OR MESH STRUCTURES WITH HIGH ASPECT RATIO RIBS

RELATED APPLICATIONS

This application is a continuation of co-pending U.S. application Ser. No. 16/022,132 filed Jun. 28, 2018, which is a continuation of U.S. application Ser. No. 15/418,135 filed Jan. 27, 2017, which issued as U.S. Pat. No. 10,024,002 on Jul. 17, 2018, which is a continuation of U.S. application Ser. No. 13/618,625 filed Sep. 14, 2012, which issued as U.S. Pat. No. 9,556,580 on Jan. 31, 2017, which is a continuation of U.S. application Ser. No. 12/379,058 filed Feb. 11, 2009, abandoned, which claimed priority from U.S. provisional application, Ser. No. 61/064,102, filed Feb. 15, 2008, the priority of which is hereby claimed.

FIELD OF THE INVENTION

The present invention relates generally to polymeric grids and bonded composite mesh structures used for mechanical stabilization or retention in civil and construction engineering applications. More specifically, the present invention relates to such polymeric grids and composite mesh structures, especially integral geogrids, which have high aspect ratio reinforcing ribs. These grids or mesh structures possess strands or ribs that are arranged along at least two different axes within the plane of the structure.

BACKGROUND OF THE INVENTION

The mechanisms for explaining the reinforcing effect of a geosynthetic that includes multi-axial geogrids on a granular material such as soil or stone, for example, when a reinforced structure is used to resist the rutting effects of vehicle traffic, are still being developed. Studies, such as reported in the article entitled *Aggregate Base Residual Stresses Affecting Grid Reinforced Flexible Pavement Response*, Kwon et al., appearing in the *International Journal of Pavement Engineering*, i First article 2007, 1-11, have shown that it is not possible to describe the reinforcing effect based on the individual properties of the geogrid and granular materials alone. It is therefore necessary to introduce the concept of a composite matrix or rigid confinement layer consisting of the geogrid and the granular material that is confined and restrained by the geogrid. When a granular civil engineering structure is reinforced by a geosynthetic material of proper design having high junction strength and structural integrity, such as an integral geogrid, the resulting composite matrix is capable of withstanding increased loads and/or decreased deformations compared to an unreinforced structure.

Some of the factors that can explain the reinforcing effect of this composite matrix include (1) increase in the sustainable load due to reduced sliding and rolling of granular material due to its confinement by the geogrid; (2) increase in the shear resistance of the granular material due to frictional forces between the granular materials and the geogrid; (3) increase in the resistance to lateral bulging of the mass of granular material by the restraining effects of a stiff geogrid with strong junctions; and (4) increase in the resistance to deformation through strong mechanical bonds that form between the granular material and the rigid geogrid. The mechanical bonding, or interlocking, effect is believed to be dependent on the relative sizes of the geogrid aperture compared to the granular material.

Aperture stability modulus (ASM), a relative measure of in-plane geogrid rigidity, is one property that has been identified as useful for quantifying the reinforcing effect related to the rutting resistance of wheel loads from vehicular traffic. Actual field tests to compare the traffic performance of flexible pavements using multi-axial geogrids as reinforcement for the base courses were conducted with geogrid materials made by several methods, i.e. integral geogrids formed by punching and stretching flat sheets, integral geogrids formed from extruded and stretched grids, and geogrids formed from stitch-bonded woven fabrics. See (Webster, Steve L.; *Multi-axial geogrid Reinforced Base Courses for Flexible Pavements for Light Aircraft: Test Section Construction, Behavior under Traffic, Laboratory Tests, and Design Criteria;* Report DOT/FAA/RD-92; December 1992. The results demonstrated that the relative resistance of asphalt pavement test sections to rutting by a heavy wheel load correlated well with a proposed test for aperture stability modulus.

The aperture stability modulus test is carried out by clamping a sample of a multi-axial geogrid in a fixture to stabilize it and then attaching a small clamp to the ribs in an area around a junction. The junction clamp is attached to a system of pulleys and weights such that a known torque can be applied to the junction. The amount of torque required to rotate the area around the junction by a designated number of degrees is defined as the aperture stability modulus.

If carried out only on one single junction, the aperture stability modulus test can easily distinguish the relatively rigid junctions of an integral geogrid having integrally-formed junctions from a geogrid having junctions that are much less rigid when only bonded together. The aperture stability modulus also provides a relative indication of the stiffness of a geogrid. For example, a geogrid constructed by stitch bonding polymeric filaments will be quite flexible in comparison to an integral geogrid formed by punching and subsequently orienting polymeric sheet.

Because a correlation had been established relating aperture stability modulus to geogrid performance, recent design work for new geogrid structures has sometimes focused on maximizing the aperture stability modulus. In particular, U.S. Pat. No. 7,001,112 (hereinafter the '112 patent), owned by the assignee of the present invention, teaches that the aperture stability modulus is increased by approximately 65% over a conventional biaxial geogrid, having similar weight in grams per square meter, by employing six-rib structures with triangular apertures. The subject matter of the '112 patent is expressly incorporated into this specification by reference as if the '112 patent were set forth herein in its entirety.

One means of increasing aperture stability modulus, after ensuring that the grid structure possesses rigid connecting junctions or nodes, is to increase the bending stiffness of the ribs in the plane of the geogrid. The higher the resistance of the ribs to in-plane shear or bending moment, the more the ribs will contribute to the apparent "stiffness" of the aperture as measured by the techniques employed to determine aperture stability modulus. Optimum in-plane shear and bending resistance for a given mass of rib material can be obtained by choosing a low aspect ratio rib shape, where aspect ratio (AR) is defined as the most representative value of the ratio of the thickness or height of the rib cross-section to the width of the rib cross-section. To maximize the shear and bending resistance, the low aspect ratio rib, typically with AR less than one, has therefore been the preferred rib shape to maximize aperture stability modulus. The teaching of the '112 patent in fact employs a rib with aspect ratio as low as 0.38 in order to achieve high aperture stability modulus.

Low aspect ratio multi-axial geogrids have been specified in U.S. Pat. Nos. 5,156,495 and 5,419,659. In U.S. Pat. No. 5,156,495, civil engineering structures are disclosed where biaxially-oriented mesh structures have an AR of the oriented strands substantially less than unity. Finally, in U.S. Pat. No. 5,419,659, methods for constructing civil engineering structures are disclosed using biaxial geogrids where the AR of the thickness to the width of the orientated strands is substantially less than unity.

Multi-axial geogrids can be manufactured by several different methods, some of which have been used for over 25 years. Generally, such geogrids consist of ribs or strands made of oriented plastics materials. Multi-axial integral geogrids are manufactured by extruding an integrally cast sheet of polymer material which is subjected to a defined pattern of holes or depressions followed by the controlled biaxial orientation of the polymer material to cause the holes or depressions to form into apertures or mesh openings. The manufacture of such multi-axial geogrids and other integral polymer grid structures can be accomplished by well known techniques. As described in detail in U.S. Pat. Nos. 4,374,798, 4,590,029, 4,743,486, 4,756,946 and 7,001,112, a starting polymer sheet material is first extruded and then punched to form the requisite defined pattern of holes or depressions. In U.S. Pat. Nos. 3,252,181, 3,317,951, 3,496,965, 4,470,942, 4,808,358 and 5,053,264, the starting material with the requisite pattern of holes or depressions is formed in conjunction with a polymer extrusion. Other known methods for manufacturing multi-axial geogrids include, for instance, stitch bonding fabrics made of filaments, such as polyester, and applying a flexible coating, such as a PVC coating, or by weaving or by knitting, or even spot welding oriented plastic strands together. It is intended that the present invention be applicable to all types of multi-axial geogrids regardless of the method of forming the geogrid. However, integral geogrids are preferred.

Multi-axial geogrids currently in use for civil engineering structures have aspect ratios less than unity. For example, the aspect ratios of integral geogrids (with integral junctions) that are formed by punching and orienting plastics sheet are less than 1, typically in the range 0.2 to 0.9. Stitch-bonded fabric geogrids typically consist of multiple yarn bundles that are bonded by stitching and/or a coating process; the multiple yarn bundles are laid side by side to produce a composite strand of two or more adjacent yarns. Aspect ratios of these fabric geogrids typically range from about 0.1 to 0.6. Aspect ratios of grids produced by orienting extruded net structures are typically around 0.25 to 0.9. By comparison, geogrids formed by spot-welding or otherwise bonding oriented plastics strips often have very low aspect ratios, for example, less than or equal to approximately 0.2.

A high aperture stability modulus alone, however, does not necessarily constitute a multi-axial geogrid that will perform optimally when incorporated as a reinforcement or retention means for civil engineering applications. Geogrids formed by spot-welding or otherwise bonding low aspect-ratio oriented plastic strands together, for example, possess very high values of aperture stability modulus but, when incorporated into a civil engineering structure, have been demonstrated to have limited ability to resist the rutting effects of vehicle traffic when compared to integral geogrids formed with integral junctions.

Also, one can simply increase the thickness of the grid structure to increase the aperture stability modulus, but this approach adds weight and increases product cost. The preferred geogrid is one that achieves the highest amount of reinforcing effect with the lowest geogrid weight and cost.

Multi-axial geogrids have generally been formed such that the meshes or apertures have a square or rectangular shape and consist of series of parallel ribs or strands that intersect at right angles to form junctions. The ribs or strands are arranged in both a longitudinal direction, i.e., in the machine direction of the finished product as well as transversely, i.e. at right angles to the longitudinal strands. The strands usually consist of oriented polymer material in order to achieve high tensile strength with relatively low weight. Such multi-axial geogrids provide a reinforcing effect by distributing applied stresses to the longitudinal and transverse ribs.

SUMMARY OF THE INVENTION

In light of the foregoing discussion, the present invention is based on the surprising discovery that a multi-axial geogrid or other mesh structure having ribs or strand cross-sections with a high aspect ratio provides improved performance when the geogrid is utilized as a reinforcing component in a civil engineering structure, for example, in a roadway or airstrip, where one or more layers of geogrid are employed as both subgrade improvement or base course reinforcement. This discovery reveals that junction stability alone, as measured by the aperture stability modulus, does not fully describe the ability of a multi-axial geogrid in a reinforced structure to resist the rutting effects of vehicle traffic. While not intending to be bound hereby, it is presently believed that a high aspect ratio rib provides increased confinement or interlocking of the granular material contributing to the enhanced composite matrix or rigid confinement layer effect, and this enhanced effect results in a civil engineering structure that better resists the applied vehicle load.

Another aspect of the present invention is the combination of a high aspect ratio rib with an improved load distribution geogrid geometry. For example, a multi-axial geogrid possessing six strands radiating from each junction and thus having triangular apertures will more effectively distribute applied stresses compared to multi-axial geogrids having rectangular apertures. When a six-strand geogrid is formed with high aspect ratio ribs as demonstrated by the instant invention, the resistance of the geogrid to rutting by vehicle traffic is greatly enhanced compared to similar geogrids with low aspect ratio ribs. Triangular geogrids formed with substantially equilateral triangular opening or apertures are preferred.

Moreover, the magnitude of improved resistance to rutting in going from a low to high rib aspect ratio is found to be greater for triangular geogrids compared to the magnitude of improvement obtained with rectangular geogrids. In addition to the increased confinement of the granular material provided by the high aspect ratio ribs, the triangular aperture arrangement provides a superior configuration of reinforcing ribs that more effectively distributes applied stresses within the geogrid structure. Hence, a higher ASM value may be desirable for rectangular geogrids, whereas the ASM value does not appear to be a factor in triangular geogrids. In any event, it is intended that the present invention be applicable to all multi-axial geogrids and mesh structures, regardless of whether the apertures are triangular or rectangular in shape.

Furthermore, it is widely accepted that the investigation of the mechanisms that affect the performance of geosynthetics, and in particular integral geogrids, in granular layers under rolling wheel trafficking conditions is a complicated issue. The generation of a 'stabilized layer' within the unbound aggregate is the ultimate goal and in order to achieve this goal the unbound aggregate is required to be confined or interlocked and its movement restricted in order to reduce the vertical deformation due to loading. It is this vertical deformation that produces the detrimental, common rutting channels seen on many roads and hard surfaces. The most critical region in providing stabilization is the geogrid/aggregate interface as this interface is the primary region that will dictate the degree to which the geogrid interlocks with the aggregate and thus restricts the movement of the aggregate, Hence, the geogrid/aggregate interface can have a major effect on the performance of the stabilized layer.

Historically, biaxially oriented geogrids have been produced with simple rectangular or square shaped apertures with all the tensile elements or ribs forming an angle of 90° at the point of their junction or intersection. Although some thought has been applied to the optimum size of the aperture in relation to the size of the intended aggregate in a particular application, the aperture shape and intersection angle have remained the same until recently.

As discussed above, an integral geogrid having triangular apertures in accordance with the '112 patent has been shown to be a more efficient use of the available polymer and to reduce the trafficking deformation in various applications when compared to integral geogrids with rectangular or square apertures. In combination with high aspect ratio ribs in accordance with the present invention, it is believed that the shape of the aperture may also be a factor in the improvements observed. As equilateral triangular apertures have an included angle of only 60° between the ribs instead of the previous 90° rectangular or square apertures, the "wedge action" of this smaller angle may provide a greater, and possibly faster, confinement for the aggregate, particularly for the aggregate in contact with the geogrid but also extending upwards from this area towards the surface. Full scale trafficking testing has shown that after the test is complete the excavation and removal of the aggregate from the geogrid surface is significantly more difficult for equilateral triangular apertures than for rectangular or square apertures as the aggregate appears to be tightly wedged into the 60° angles of the triangular apertures.

The aspect ratio for the tall or high AR ribs for multi-axial geogrids in accordance with the present invention should be greater than 1.0. It is currently believed that the aspect ratio for triangular geogrids in accordance with the present invention should preferably be in the range between about 1.4 and about 2.2, but can be as low as greater than 1.0 and as high as about 2.5, or above. It is currently believed that the aspect ratio for rectangular geogrids in accordance with the present invention should be in the range between greater than 1.0 and about 4.0, with an accompanying aperture stability modulus greater than about 0.3 Nm/degree at 20 kg-cm of applied torque and, more preferably, greater than about 0.45 Nm/degree at 20 kg-cm applied torque. These preferred AR dimensions and ASM values may vary depending upon the different structures and methods for making different type multi-axial geogrids, and variations in the dimensions can be developed through testing by those skilled in the art. Further, the cross-section of the high AR ribs according to the present invention need not be exactly rectangular, for example, may have concave sides.

Accordingly, it is an object of the present invention to provide a multi-axial grid or mesh structure having a generally uniform array of substantially straight oriented transverse strands or ribs interconnected by junctions extending transversely across the grid or mesh structure in spaced apart rows and a plurality of substantially straight oriented connecting strands or ribs interconnecting the junctions in adjacent rows to form apertures or openings between adjacent oriented strands or ribs and junctions, in which the strands or ribs have an aspect ratio greater than 1.0.

Another object of the present invention is to provide a grid or mesh structure in accordance with the preceding object in which the grid or mesh structure is in the form of a triangular geogrid and the aspect ratio of the oriented strands or ribs is between greater than 1.0 and about 2.5, and preferably between about 1.4 and about 2.2, and the apertures or openings are preferably in the shape of an equilateral triangle.

A further object of the present invention is to provide a grid or mesh structure, in accordance with the first object in which the grid or mesh structure is in the form of a rectangular geogrid and the aspect ratio of the oriented strands or ribs is between greater than 1.0 and about 4.0.

Still another object of the present invention is to provide a grid or mesh structure in accordance with the preceding object in which the grid or mesh structure also has an aperture stability modulus greater than about 0.3 Nm/degree at 20 kg-cm of applied torque, and preferably greater than about 0.45 Nm/degree at 20 kg-corn of applied torque.

Still a further object of the present invention is to provide a grid or mesh structure in accordance with any of the preceding objects in which the grid or mesh structure is an integral geogrid.

Yet another object of the present invention is to provide a method of strengthening a particulate material by embedding in the particulate material any of the above-described multi-axial grids or mesh structures.

Yet a further object of the present invention is to provide a geoengineering construction made up of a mass of particulate material strengthened by embedding therein a multi-axial geogrid or mesh structure in accordance with any of the above-described grids or mesh structures.

Still yet another object of the present invention is to provide a method of retaining a particulate material by embedding any multi-axial grid or mesh structure as described above in the particulate material so that the particulate material is at least partially interlocked in the apertures or openings of the grid or mesh structure.

A final object to be set forth herein is to provide a method of making a biaxially oriented plastic material integral geogrid from a plastics sheet starting material by having holes arranged in an array of substantially identical shape and size by selecting a starting material thickness, a hole dimension, and pitch configuration of the array so as to produce oriented strands of the integral geogrid having an aspect ratio greater than 1.0.

Definitions of Terms as Used Herein

The term "multi-axial" refers to a grid or mesh structure consisting of strands or ribs that are arranged along at least two different axes within the plane of the structure.

The term "geogrid" shall refer to a "multi-axial geogrid" unless the word "geogrid" is preceded by the word "uniax" or "uniaxial."

The term "triangular geogrid" refers to a multi-axial geogrid having generally triangular apertures or openings.

The term "rectangular geogrid" refers to a multi-axial geogrid having generally rectangular apertures or openings.

The term "integral geogrid" shall refer to an oriented multi-axial geogrid made by biaxially stretching a starting sheet material having a defined pattern of holes or depressions therein which form apertures in the resulting multi-axial geogrid.

The terms "thick", "thin", "thickness", "deep", "depth", and "shallow" refer to the dimension normal to the plane of the starting material or mesh structure and the terms "wide", "narrow", and "width" refer to the appropriate dimension in the plane of the starting material or mesh structure.

The term "aspect ratio" is defined as the most representative measure of the ratio of interconnecting rib thickness to width. Thickness and width are typically measured at the mid-point of the rib, i.e. half-way between the junctions, providing that the rib dimensions are relatively uniform. The regions where the ribs or strands intersect the nodes are excluded from the measurements for determining aspect ratio. If the rib dimensions are not uniform, then the aspect ratio should be taken as the value that occurs most frequently along the rib's length between intersecting junctions, for example by constructing a histogram of aspect ratio along the length of each set of parallel ribs in the grid structure to determine the value of greatest frequency. Both the thickness and width of the ribs or strands and hence the aspect ratio values may vary along the length of the ribs or strands, especially as they pass through connecting junctions or nodes.

The terms "aperture stability modulus", ASM, or "torsional rigidity" refer to the relative stiffness of the geogrid apertures comprising ribs or strands and the junctions where they intersect in a multi-axial geogrid as determined by test procedures referred to herein.

The term "vehicular traffic" refers to the loading that a civil engineering structure will experience as the result of the dynamic loads that occur from the passage of wheeled vehicles upon the surface of the structure.

The term "oriented" means molecularly-oriented. In general, when an oriented strand is referred to, the direction of orientation is parallel to the longitudinal axis of the strand.

"Aperture" refers to the open areas in the geogrid structure, i.e. the open areas that are bordered by the ribs or strands that can act to constrain granular material.

"Uniax" and "biax" mean uniaxially-oriented and biaxially-oriented, respectively.

In relation to a mesh structure, "biaxially-oriented" means that the mesh structure has been stretched in two directions generally at right angles to each other.

The holes in the starting material may be through-holes or blind holes. If the holes are blind, the film or membrane in the hole will either rupture on stretching, or may remain as a thin membrane. The holes can be formed by punching them out from the starting material, as disclosed in U.S. Pat. No. 4,374,798, or can be formed by extrusion as disclosed in U.S. Pat. No. 5,053,264, or can be formed by suitable embossing, or in any other appropriate manner.

"MD" is the machine direction, or in experimental work, the anticipated machine direction, normally the long dimension of the geogrid.

"TD" is the transverse direction, or in experimental work, the anticipated transverse direction, substantially at right angles to the MD.

The term "granular material" includes rocks, stones, gravel, sand, earth, clay, aggregate held by a binder such as asphalt or cement, concrete, or any other particulate or cohesive material used in geotechnical engineering or building. The terms "soil" or aggregate as used herein have the same meaning as "particulate material".

A "comparable conventional biax geogrid" is a conventional biax integral geogrid having a low aspect ratio ribs (less than 1.0), made by stretching a plastics sheet starting material and stretching biaxially, the starting material being the same plastics material and the geogrid having the same weight per unit area.

Unless the context clearly requires otherwise, throughout the description and the claims, the words "comprise" and the like are used in an inclusive as opposed to an exclusive or exhaustive sense, that is to say, in the sense of "include, but not limited to".

DESCRIPTION OF THE DRAWINGS

The objects of the invention, as well as many of the intended advantages thereof, will become more readily apparent when reference is made to the following description taken in conjunction with the accompanying drawings.

DETAILED DESCRIPTION

Further scope of applicability of the present invention will become apparent from the detailed description and examples given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. Also, in describing the preferred embodiments, specific terminology as defined above will be resorted to for the sake of clarity. It is to be understood that each specific term includes all technical equivalents which operate in a similar manner to accomplish a similar purpose.

Figure 1:
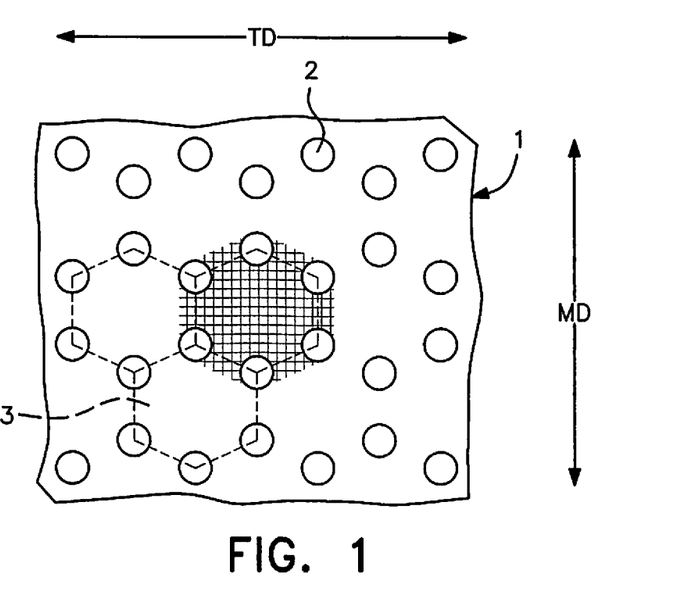
FIG. 1 is a plan view of a portion of a first starting material with the holes in a hexagonal pattern.
Figure 2:
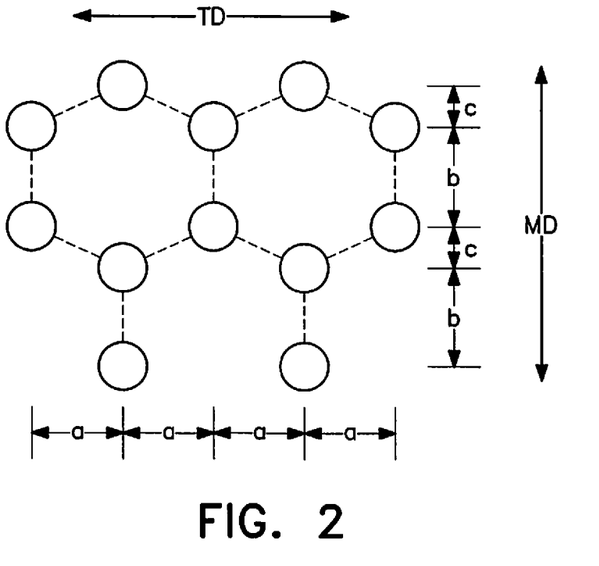
FIG. 2 corresponds with FIG. 1, but shows letters a, b and c for hole spacing dimensions.
Figure 3:
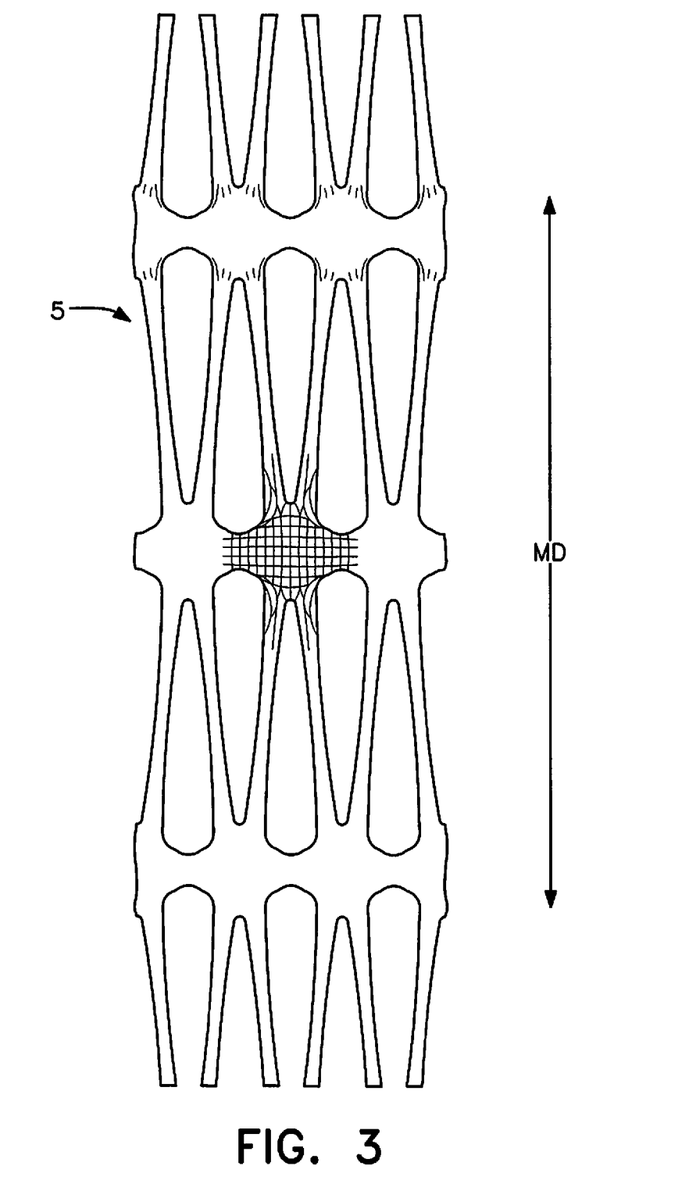
FIG. 3 is a plan view of the starting material shown in FIGS. 1 and 2 which has been uniaxially stretched in the machine direction (MD).
Figure 4:
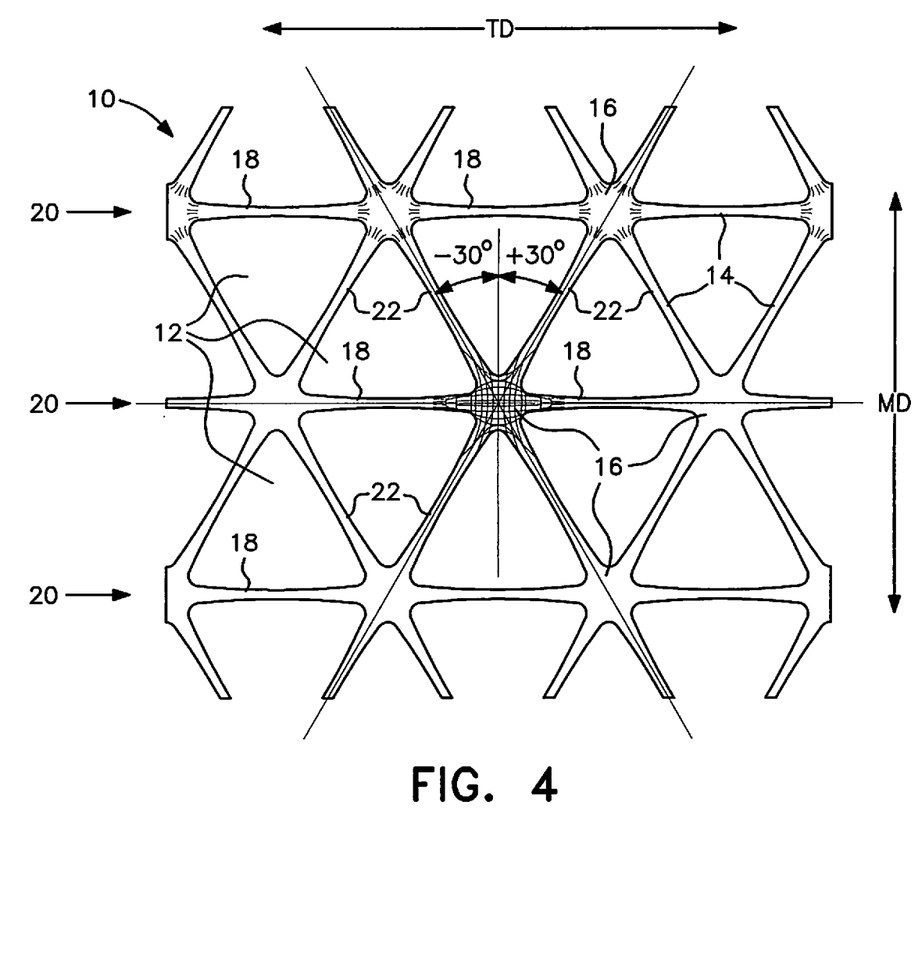
FIG. 4 is a plan view of a multi-axial geogrid, having triangular apertures, made from stretching the material shown in FIG. 3 in the transverse direction (TD).

In a first preferred embodiment shown in FIGS. 1-4, a triangular geogrid 10 shown in FIG. 4 is prepared from a starting material 1 shown in FIG. 1. The starting material is preferably a uniplanar sheet of extruded plastics material having planar parallel faces, although other sheet-like materials can be used. Holes 2 are punched or formed in an array of hexagons 3 of substantially identical shape and size so that substantially each hole 2 is at a corner of each of three hexagons 3. To produce the triangular geogrid 10 from the punched sheet, the starting material 1 is heated and a first stretch is applied in the notional MD, i.e., in a direction substantially parallel to the MD sides of the hexagons 3 shown in FIG. 1. The resulting uniaxially oriented grid 5, shown in FIG. 3, is then subsequently stretched in the TD to produce the biaxially oriented triangular geogrid 10, shown in FIG. 4. The resulting multi-axial geogrid 10 consists of triangular apertures 12 with ribs or strands 14 that meet at each junction 16 with angles of approximately 60°.

As shown in FIG. 4, the grid or mesh structure 10 includes a generally uniform array of substantially straight oriented transverse strands or ribs 18 interconnected in line by junctions 16 to extend transversely across the grid or mesh structure in spaced apart transversely extending rows, generally designated by reference numeral 20. A plurality of substantially straight oriented connecting strands or ribs 22 interconnect the junctions 16 in adjacent rows 20, which together with the transversely extending strands or ribs 18 form apertures or openings 12 that have a generally equilateral triangular shape.

In accordance with the present invention, the thickness of the starting material 1, and the dimensions for the spacing of the punched holes 2, noted as a, b, and c in FIG. 2, i.e., punched pitch, are selected so that the aspect ratio of the ribs or strands 14 of the triangular geogrid 10 is greater than 1.0, preferably in the range between about 1.4 and about 2.2, but can vary as high as about 2.5, or above.

More specifically, if the hole spacing, i.e., punch pitch, is held constant, then the aspect ratio of the ribs or strands will increase as the starting sheet thickness is increased. However, there is an interaction effect between the starting punch pitch and the sheet thickness that determines the final rib aspect ratio of the final geogrid because both pitch and thickness can be varied independently.

Figure 6:
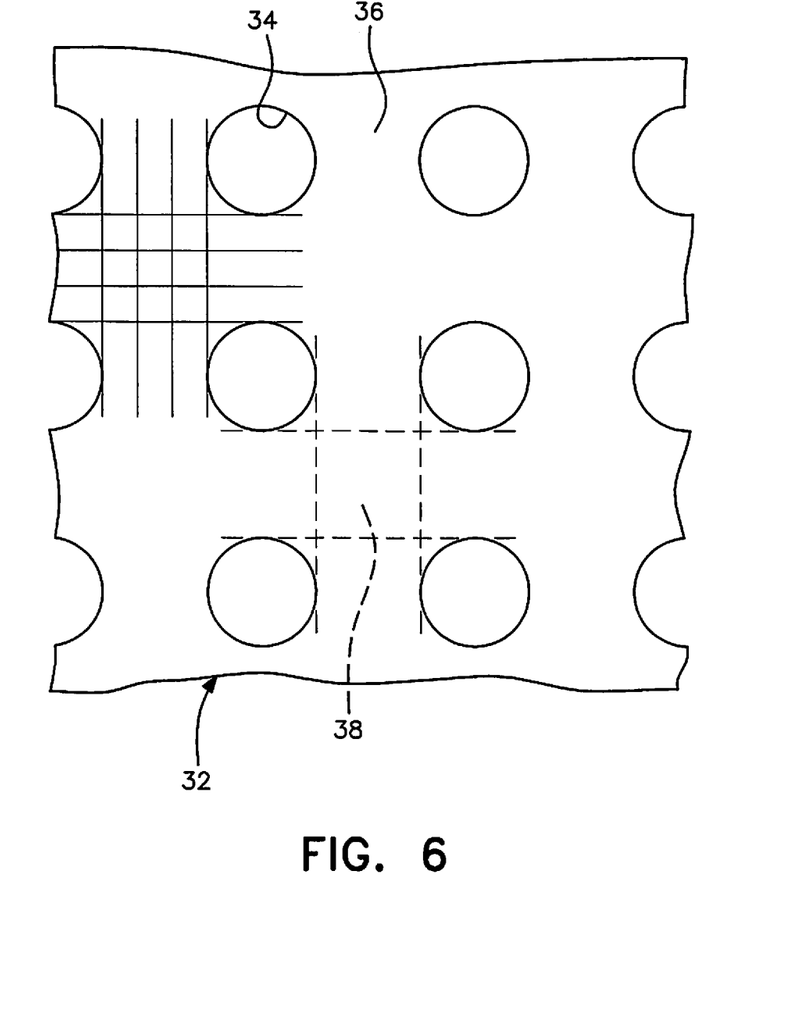
FIG. 6 is a plan view of a portion of a second starting material with the holes in a rectangular pattern.
Figure 7:
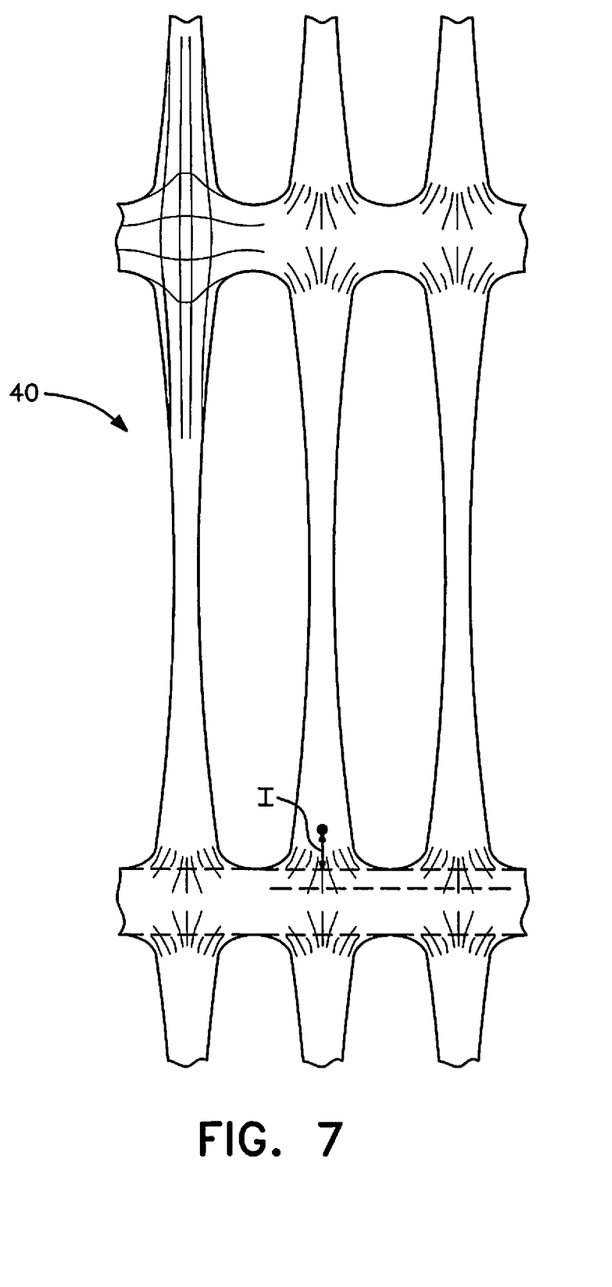
FIG. 7 is a plan view of the starting material shown in FIG. 6 after having been uniaxially stretched in the machine direction.
Figure 8:
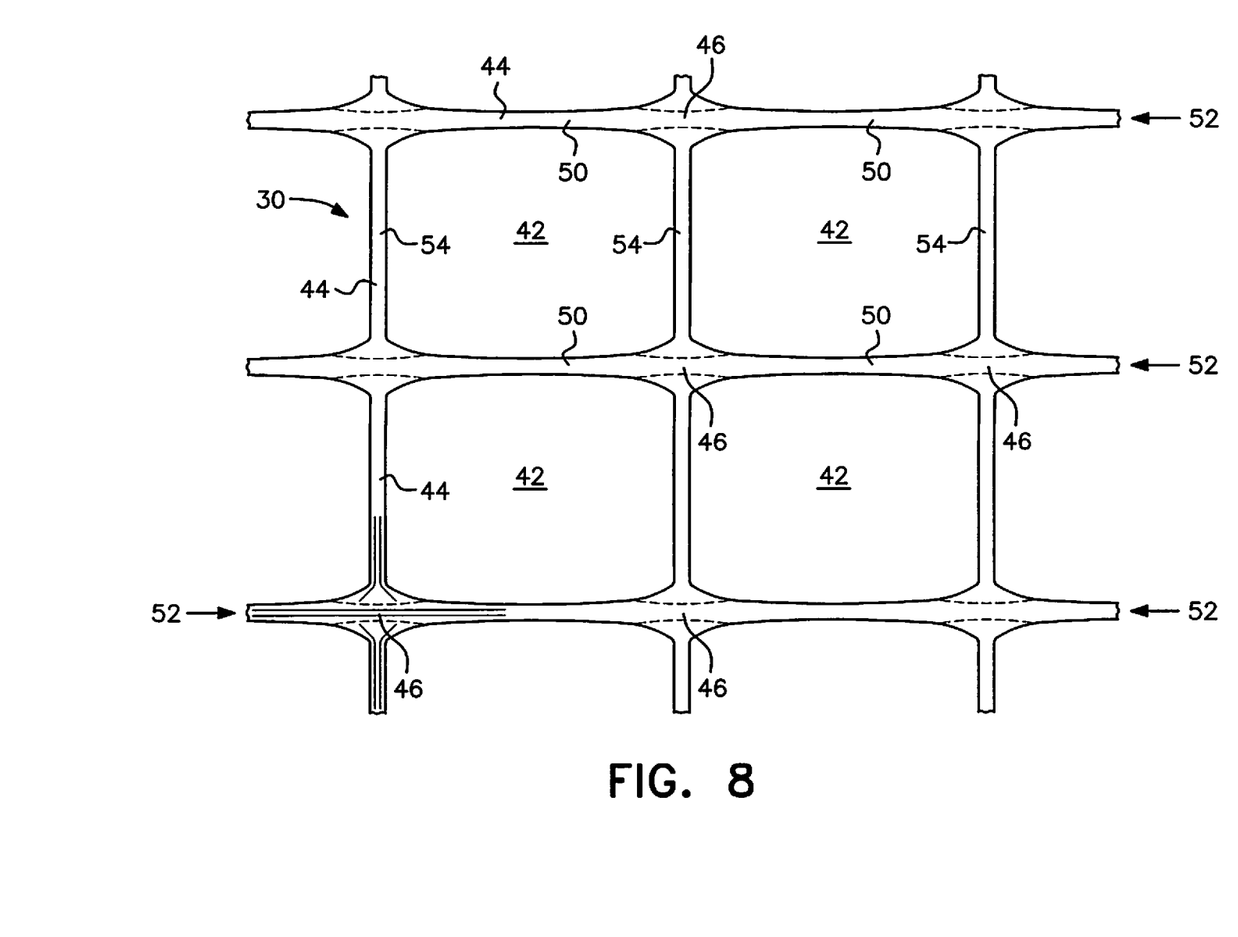
FIG. 8 is a plan view of a multi-axial geogrid with rectangular apertures formed by stretching the material of FIG. 7 in the transverse direction.

In a second preferred embodiment shown in FIGS. 6-8, a rectangular geogrid 30 shown in FIG. 8 is prepared from a starting material 32 shown in FIG. 6. As described in U.S. Pat. No. 4,374,798, the starting material 32 shown in FIG. 6 is preferably a uniplanar sheet 36 of extruded plastics material having planar parallel faces. However, other extruded starting materials can be employed. Holes or depressions 34 are punched or formed in a square or rectangular array 38 to produce the multi-axial geogrid 30 from the punched or formed starting sheet 32. The starting sheet 32 is heated and a first stretch is applied in the notional MD, i.e., in a direction substantially parallel to the MD sides of the rectangular hole pattern indicated in FIG. 6. The resulting uniaxially oriented geogrid 40, shown in FIG. 7, is subsequently stretched in the TD to produce the biaxially oriented final product 30, as shown in FIG. 8. The resultant multi-axial geogrid 30 consists of square or rectangular apertures 42 with ribs or strands 44 that meet at each junction 46 with angles at approximately 90°.

As shown in FIG. 8, the grid or mesh structure 30 includes a generally uniform array of substantially straight oriented transverse strands or ribs 48 interconnected by junctions 46 extending transversely across the grid or mesh structure in spaced apart transverse rows, generally designated by reference numeral 52. A plurality of substantially straight oriented connecting strands or ribs 54 interconnect the junctions 46 in adjacent rows 52, which together with transversely extending strands or ribs 50 form generally rectangular apertures or openings 42.

In accordance with the present invention, the thickness of the starting sheet 32, and the size and spacing of holes or depressions 34, are selected so that the ribs or strands of the resultant rectangular geogrid 30 have an aspect ratio greater than 1.0 and less than about 4.0, with an accompanying aperture stability modulus (ASM) greater than 0.3 Nm/degree at 20 kg-cm of applied torque and, more preferably, greater than 0.45 Nm/degree at 20 kg-cm of applied torque.

Test Methods for Examples

A general method for measuring the aperture stability modulus (ASM) for the examples is outlined in "GRI Test Method GG9, Standard Test Method for Torsional Behavior of Bidirectional Geogrids when Subjected to In-Plane Rotation," Geosynthetic Research Institute, Mar. 10, 2004. For the ASM testing described herein, multi-axial geogrid samples having approximate dimensions of 350 mm×350 mm with a junction, or node, positioned exactly in the center of the frame were clamped all around their peripheries using a square clamping frame or containment box. The torquing device, consisting of a matched set of plates, was fastened to the test sample using four bolts for conventional biaxial geogrid products having strands or ribs intersecting at or nearly at 90 degree angles.

In order to adapt the test method to the six-strand geogrid geometry, for example, the torquing device was modified such that the bolts would immediately bear against the ribs or strands of the sample when the torque was applied. In this case, a torquing device with six bolts spaced at 60 degrees around the device was employed. To carry out the test, the torquing device was rotated relative to the perimeter clamp by applying increasing amounts of torque in order to determine in-plane torsional rigidity, as described in test method referenced above with the exception that only one loading cycle was performed. In the teaching of the '112 patent, results of the aperture stability modulus test were presented as the number of degrees that the junction clamp attached to the sample has rotated for the applied torque value of 4.5 Nm. The smaller the number of degrees of rotation for a given torque value, the higher the ASM, or torsional rigidity, value. This convention is used for triangular geogrids in this specification. Another unit of measure for reporting ASM test results for geogrids with rectangular apertures is Nm/degree (Newton-meter per degree) at an applied torque value of 20 kg-cm. The higher the Nm/degree value, the higher the torsional rigidity of the sample. For rectangular aperture geogrids in this specification, AMS values are reported using Nm/degree at 20 kg-cm applied torque.

The performance of a multi-axial geogrid for resisting rutting due to vehicle traffic was evaluated using a new small-scale test to simulate well-established field tests such as the one described by Webster (above). The small-scale test is designed to reproduce the results of well-established field tests for traffic performance of multi-axial geogrids and comprises a test section consisting of an underlying clay subgrade, a single layer of geogrid, and a compacted granular sub base. The test section is subjected to the load of a single weighted wheel. The wheel traverses the test section along a single horizontal path, constantly reversing direction from one end of the test section to the other end. A control test section with no geogrid present will rapidly fail under such testing. For example, after 1000 passes of the wheel on an unreinforced test section, a deep rut will be formed. By using properly designed multi-axial geogrids as reinforcement, decreased amounts of rutting depth will occur for a given number of wheel passes compared to an unreinforced test section. This decreased rut depth has an impact on the lifetime of the civil engineering structure and can extend this lifetime by factors of up to 50 times that of an unreinforced structure. Hence, a roadway or other civil engineering structure reinforced in accordance with the present invention will have increased longevity and decreased maintenance requirements.

EXAMPLES

FIGS. 1 to 5 and Table 1—First High Aspect Ratio Samples

In a first set of high aspect ratio rib samples configured according to the present invention, the samples were prepared as described in accordance with the FIGS. 1-4 embodiment using the preferred strictly uniform starting material. The dimensions for the spacing of the punched holes, or pitch, noted as a, b, and c in FIG. 2, was varied. In these samples, the resulting multi-axial geogrid consisted of triangular apertures with ribs or strands that meet at each junction with angles at approximately 60°.

TABLE 1

First Set of Geogrid Samples According to the Present invention with Triangular Apertures

| Example | Sheet thickness mm | Dimension a, mm | Dimension b, mm | Dimension c, mm | Rib Aspect Ratio |
|---|---|---|---|---|---|
| C1 | 4.7 | 9.5 | 10.5 | 4 | 0.63 |
| C2 | 4.7 | 10.63 | 11.52 | 4.43 | 0.38 |
| 1 | 3.2 | 6.19 | 6.71 | 2.58 | 1.06* |
| 2 | 3.4 | 6.19 | 6.71 | 2.58 | 0.97 |
| 3 | 3.4 | 5.41 | 5.86 | 2.26 | 1.02 |
| 4 | 3.4 | 4.64 | 5.03 | 1.94 | 1.19 |
| 5 | 3.4 | 3.86 | 4.19 | 1.61 | 1.88 |
| 6 | 3.6 | 6.19 | 6.71 | 2.56 | 1.19* |
| 7 | 3.8 | 6.19 | 6.71 | 2.58 | 1.2 |
| 8 | 4 | 6.19 | 6.71 | 2.58 | 1.26 |
| 9 | 4 | 5.41 | 5.86 | 2.26 | 1.39 |
| 10 | 4 | 4.64 | 5.03 | 1.94 | 1.56 |
| 11 | 4 | 3.86 | 4.19 | 1.61 | 2.19 |
| 12 | 4.8 | 7.74 | 8.35 | 3.22 | 1.27* |
| 13 | 4.8 | 6.19 | 6.71 | 2.58 | 1.4 |
| 14 | 4.8 | 5.41 | 5.86 | 2.26 | 1.81* |
| 15 | 4.8 | 4.64 | 5.03 | 1.94 | 2.1* |
| 16 | 4.8 | 3.86 | 4.19 | 1.61 | 2.55* |
| 17 | 5.8 | 7.74 | 8.35 | 3.22 | 1.53* |
| 18 | 5.8 | 6.19 | 6.71 | 2.58 | 2.01 |
| 19 | 5.8 | 5.41 | 5.86 | 2.26 | 2.18* |
| 20 | 5.8 | 4.64 | 5.03 | 1.94 | 2.54* |
| 21 | 5.8 | 3.86 | 4.19 | 1.61 | 3.08* |
| 22 | 6.8 | 6.19 | 6.71 | 2.58 | 2.2 |

*Predicted

Table 1 presents geogrid Samples 1 through 22 to illustrate the instant invention using triangular apertures (a few of the samples are from actual tests, the others are representative), along with Comparative Examples C1 and C2 taken from data presented in the '112 patent. Compared to the '112 patent, the spacing or pitches of the holes, shown as dimensions a, b, and c in FIG. 2, have been reduced for the instant invention in order to produce the higher aspect ratio rib shape. As shown in Table 1, it is possible to obtain a wide range of rib aspect ratio values greater than unity by varying both punch pitch and starting sheet thickness. For example, using a small punch pitch, i.e. close hole spacing, the aspect ratio of the ribs can be significantly higher than for the Comparative Examples even when the starting sheet thickness is less than that of the Comparative Examples.

In the '112 patent, a key objective was to obtain a high value of aperture stability modulus compared to previously established commercial products based on Webster's findings. The aperture stability modulus for Comparative Example C2, as taken from FIG. 13 of the '112 patent, is 6.7 degrees of rotation at 4.5 Nm torque. The smaller the number of degrees of rotation for the specified 4.5 Nm torque value, the higher the ASM value. The '112 patent indicates that ASM was increased 65% relative to a comparable conventional biax geogrid tested under the same test conditions. (See FIG. 13 of the '112 patent and related description in the specification.) At the time it was believed that this increase in a geogrid's ASM would be favorable for improving the resistance of a reinforced structure to rutting by vehicular traffic.

According to the instant invention, however, an objective is to increase the triangular geogrid's rib aspect ratio, rather than maximizing ASM, in order to improve resistance to rutting. It has been observed that ASM has in fact decreased for samples according to the present invention compared to the test samples of the '112 patent, i.e. triangular geogrid samples tested for the instant invention have ASM values between 16 and 21 degrees of rotation at 4.5 Nm torque. The rutting resistance of a reinforced structure has, however, substantially improved compared to a reinforced structure according to the '112 patent, despite the significantly decreased ASM. Even though ASM values for samples according to the present invention are lower than for the '112 patent examples, the ASM values are nevertheless indicative of a stiff multi-axial geogrid with rigid junctions. The combination of an adequately rigid geogrid aperture plus the high aspect ratio rib shape produces superior performance, i.e. rutting resistance, in the reinforced structure. Furthermore, these first samples combine the aforementioned rigidity and high aspect ratio rib with the advantage of improved load distribution demonstrated in the '112 patent arising from the geometrical arrangement of six ribs attached to each junction at 60° angles and triangular apertures.

Figure 5:
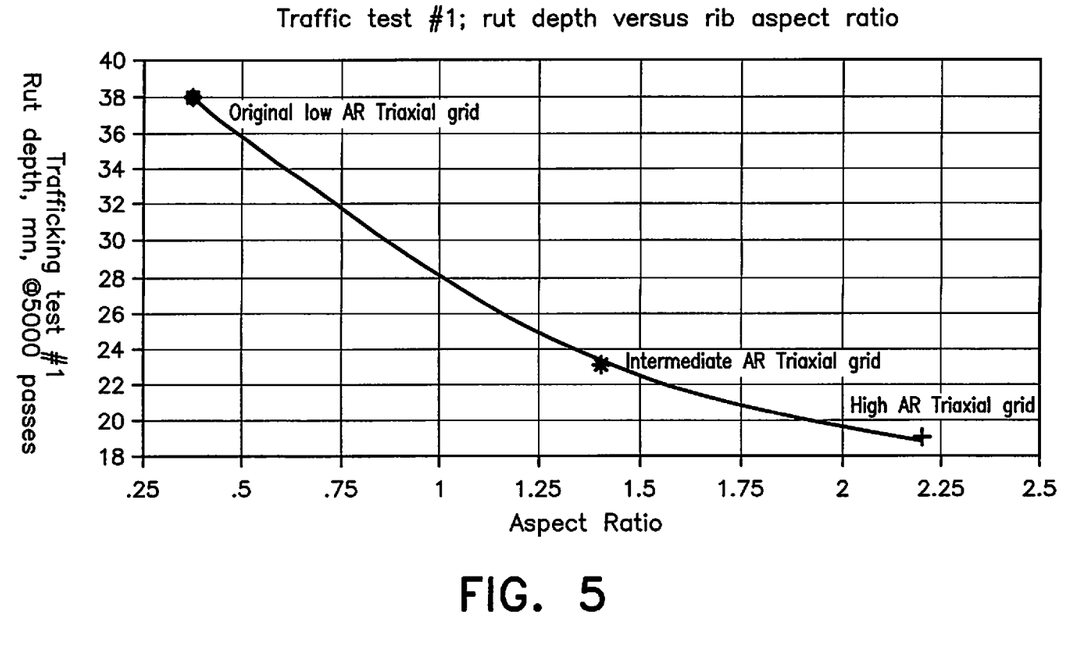
FIG. 5 is a graph presenting results according to a traffic simulation test that plots the rutting resistance of reinforced structures containing multi-axial geogrids having triangular apertures versus rib cross-sections having varying aspect ratios.

FIG. 5 displays in graphic form the rutting resistance of reinforced structures containing multi-axial geogrids having triangular apertures as described herein versus rib cross-sections of varying aspect ratios. FIG. 5 presents the results according to a traffic simulation test that was carried out as described under "Test Methods" above. The results demonstrate that resistance to rutting improves substantially as the aspect ratio of the geogrid rib is increased. FIG. 5 compares integral-junction geogrids having triangular apertures as described which possess rib aspect ratios ranging from 0.38 to 2.2. The low aspect ratio sample, corresponding to Comparative Example C2, was produced using the teaching from the '112 patent, and the samples with aspect ratios greater than unity are according to the instant invention.

As demonstrated by the examples of Table 1, rib aspect ratio can be increased as desired by employing even thicker plastics sheet for the starting material or by further modifying the punching conditions such as the hole sizes, shapes, and spacing, or by other techniques that could be developed by those skilled in the art.

The types of starting materials for the plastics sheet, the nature of the holes or depressions used to form the finished products, the available methods of manufacture, and other desired features for the final geogrid or mesh structure have been described in the prior art, including the '112 patent and other patents cited hereinbefore, and further explanation is not deemed necessary for those skilled in the art.

FIGS. 6 to 9 and Table 2—Second High Aspect Ratio Samples

In a second set of high aspect ratio rib samples configured according to the present invention, the starting material 11 shown in FIG. 6 was a strictly uniplanar sheet of extruded plastics material having planar parallel faces. Holes or depressions 12 are punched to form a square or rectangular array. To produce the multi-axial geogrid product from the punched sheet, the starting material 11 was heated and biaxially stretched as described above. In these samples, the resulting multi-axial geogrid consists of square or rectangular apertures with ribs or strands that meet at each junction with angles at approximately 90°.

One observes that Sample 28, although possessing the highest rib aspect ratio, does not exhibit the best performance as measured by rut depth or TIF. Further investigation was made, and the aperture stability modulus (ASM) was also considered. Table 2 indicates that Sample 28 has a

TABLE 2

Second Set of Geogrid Samples According to the Present Invention with Rectangular Apertures

| Example | Sheet thickness (mm) | Rib aspect ratio | Aperture stability modulus, Nm/° at 20 kg-cm torque | Actual (measured) surface deformation at 10,000 passes (mm) | Predicted surface deformation at 10,000 passes (mm) | Traffic Improvement Factor (TIF) versus unreinforced test section |
|---|---|---|---|---|---|---|
| C3 | 6.8 | 0.76 | 0.30 | | | |
| C4 | 3.1 | 0.34 | 0.38 | 57 | 49.7 | 3.32 |
| 23 | 4 | 0.52 | 0.27 | 52.4 | 53.1 | 2.44 |
| 24 | 4.8 | 0.57 | 0.36 | 46.2 | 50.1 | 4.57 |
| 26 | 4 | 0.86 | 0.25 | 52.1 | 52.9 | 1.99 |
| 26 | 6.8 | 1.22 | 0.50 | 39.2 | 44.3 | 23.5 |
| 27 | 7.5 | 1.92 | 0.50 | 46.2 | 43.3 | 3.27 |
| 28 | 7.5 | 3.68 | 0.38 | 44.2 | 43.8 | 5.78 |

The above Table 2 presents geogrid samples 23 through 28 to illustrate the instant invention using rectangular apertures. Comparative Example C3 is a biaxial geogrid with square apertures sold commercially as Tensar type SS-30, and C4 is a similarly produced commercial product with rectangular apertures sold as Tensar BX1100. Samples 23 through 25 are additional comparative examples with AR less than 1.0 that are included for reference. Samples 26 through 28 were produced according to the instant invention with a high aspect ratio rib cross-section. In order to increase the rib aspect ratio for Samples 26 through 28, the starting sheet thickness, the punched hole size and the hole spacing were varied in a manner similar to that described for Samples 1 through 22 of Table 1. As shown, samples 26, 27 and 28 illustrate the ability to achieve rib aspect ratios greater than unity by manipulation of sheet thickness, punch pitch, and hole size.

Table 2 indicates that the best performance, i.e. the minimum rut depth value of 39.2 mm, occurs at a rib aspect ratio of 1.22 for the limited number of samples produced. The expected improvement in performance, i.e. rutting resistance, for samples with rib aspect ratios greater than 1.0 is demonstrated. Table 2 also shows the "Traffic Improvement Factor," defined as ratio of the time to reach a specified rut depth for a test sample relative to the time to reach the same rut depth with no geogrid reinforcement present. Note that Sample 26 with a 1.22 rib aspect ratio has a Traffic Improvement Factor (TIF) of 23.5, i.e. 23.5 times the lifetime compared to an unreinforced soil. Samples 26 through 28 generally have rut depths that are significantly lower than comparative example C4 and examples 23 through 25. The mean rut depth is 51.9 mm for the four samples with rib aspect ratio less than one, i.e. C4 and samples 23 through 25 The mean rut depth for samples 26 through 28, with rib aspect ratio greater than one, is 43.2 mm. The mean reduction in rut depth for the instant invention (rib aspect ratio greater than 1.0) compared to samples with rib aspect ratio less than 1.0 is 17%. Looking at the Traffic Improvement Factor, the mean TIF increases from 3.08 for samples with an aspect ratio less than 1.0 to a mean TIF of 14.6 for samples with an aspect ratio greater than 1.0. The longevity of the civil engineering structure in terms of traffic improvement factor for the instant invention is thus shown to be improved.

relatively low ASM value such that the benefit of the high rib aspect ratio has been offset somewhat by the relatively low ASM value.

A multi-linear model was constructed to examine the impact of both rib aspect ratio and ASM for rectangular geogrids. For the examples in Table 2, the following model was generated by performing a least-squares regression:

Rut depth at 10,000 passes=62.4−1.83*Rib Aspect ratio−31.4*Aperture Stability Modulus (Nm/degree at 20 kg-cm applied torque).

Therefore, the rut depth in rectangular geogrids is observed to be impacted by the combination of two geogrid properties, i.e. rib aspect ratio and ASM. As explained in the background of the invention, this is consistent with a known correlation between rectangular-aperture geogrid performance and ASM. As seen from the examples in Table 2 and in accordance with the numerical model, one can vary both aspect ratio and aperture stability modulus to arrive at an optimum product performance. For rectangular geogrids, the preferred ASM is greater than 0.3 Nm/degree at 20 kg-cm applied torque and more preferably greater than 0,45 Nm/degree at 20 kg-cm applied torque.

High aspect ratio rib geogrids made by the methods described in both the first and second sets of samples, as outlined above, can be made with a wide range of thicknesses for the starting sheet from about 3.0 mm to at least about 9.0 mm.

Polymeric grids and meshes have also been used in various commercial and geotechnical applications such as fencing (U.S. Pat. No. 5,409,196), cellular confinement (U.S. Pat. No. 5,320,455), mine stopping (U.S. Pat. No. 5,934,990) and other commercial enclosure, containment and barrier applications. The present invention can have certain advantages over known products for these applications. For example, in mine stopping, sealant, such as shotcrete, is sprayed onto the mesh structure to prevent air flow. The problem with the lower aspect ratio grids is that the sealant material tends to rebound off the wider rib surface and thus does not adhere as well and/or more sealant is required. With a higher aspect ratio product as in the present invention, the spray-on material should adhere more readily and a lesser quantity is thus required to achieve the desired barrier effect.

Alternate Embodiments

Following the teaching from this invention, other methods for manufacturing multi-axial geogrids with high aspect ratio ribs can be similarly demonstrated by relatively simple modifications to the existing methods of manufacturing geogrids, for example by stitch bonding fabrics made of, for instance, polyester filaments and applying a flexible coating such as a PVC coating, or by weaving or by knitting, by spot-welding oriented plastic strands together, by extruding undrawn parallel filaments into a net structure and subsequently stretching the structure, or by other methods of multi-axial geogrid manufacture known to those skilled in the art. One need only apply the principle of increasing the aspect ratio of the rib dimensions as taught by this invention. Such multi-axial geogrids can have rectangular apertures consisting of longitudinal and transverse strands or ribs, or the strands can be arranged to meet at the junctions with angles not equal to 90°. Stiff junctions are preferred as a desirable, but not a sole condition, to contribute toward minimizing the rutting effects of vehicular traffic.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A multi-axial geogrid comprising a first generally uniform array of substantially straight highly oriented strands or ribs extending in a first direction across said geogrid in spaced apart rows and a second generally uniform array of substantially straight highly oriented connecting strands or ribs extending in a second direction and interconnecting with adjacent rows of said first array at junctions to form apertures or openings between adjacent oriented strands or ribs extending in the first direction and in the second direction and the junctions between said first and second arrays, said strands or ribs in said multi-axial geogrid that extend in at least one of the first direction and the second direction having an aspect ratio greater than 1.0 in a completed geogrid.

2. The multi-axial geogrid of claim 1, wherein the geogrid has triangular apertures or openings, and said aspect ratio is between greater than 1.0 and about 2.5.

3. The multi-axial geogrid of claim 1, wherein the geogrid has rectangular apertures or openings, and wherein said aspect ratio is in a range between greater than 1.0 and about 4.0.

4. The multi-axial geogrid of claim 1, wherein the strands or ribs that extend in another of the first direction and. the second direction have an aspect ratio greater than 1.0 in the completed geogrid.

5. The multi-axial geogrid of claim 1, wherein said geogrid is embedded in a particulate material so that the particulate material is at least partially interlocked. in said apertures or openings.

6. The multi-axial geogrid of claim 1, wherein the first array includes a first series of parallel strands or ribs and said second array includes a second series of parallel strands or ribs, the interconnections of said. first and second series of strands or ribs at said junctions being essentially perpendicular to form general rectangular apertures or openings.

7. The multi-axial geogrid of claim 1, wherein the geogrid has three or more series of parallel strands or ribs intersecting each other at junctions such that the angles of the intersecting strands or ribs at the junction are angles not equal to 90°.

8. The multi-axial geogrid of claim 7, wherein the geogrid has three series of parallel strands or ribs intersecting each other at the junctions at angles of about 60° to form generally equilateral triangular apertures or openings.

9. The multi-axial geogrid of claim 1, wherein the strands or ribs have a concave cross-section at or near a center thereof.

10. The multi-axial geogrid of claim 1, wherein a material composition of the strands in the first array of the completed geogrid is the same as a material composition of the strands in the second array of the completed geogrid.

11. A civil engineering reinforcing structure, comprising a multi-axial geogrid including a generally uniform array of substantially straight molecularly oriented strands or ribs extending across said geogrid. in spaced apart rows in a first direction and a generally uniform array of substantially straight molecularly oriented connecting strands or ribs extending in a second direction and joined at interconnecting junctions with adjacent rows of said strands or ribs extending in said first direction to form apertures or openings between adjacent molecularly oriented strands or ribs in said first direction and in said second direction as joined at said interconnecting junctions, said molecularly oriented strands or ribs of said multi-axial geogrid in at least one of the first direction and the second direction having an aspect ratio at a longitudinal midpoint which is greater than 1.0 in completed geogrid constituting the civil engineering reinforcing structure.

12. The civil engineering reinforcing structure of claim 11, wherein said geogrid is embedded in a particulate material so that the particulate material is at least partially interlocked in said apertures or openings.

13. The civil engineering reinforcing structure of claim 11, wherein said geogrid is formed by biaxially stretching a general flat polymer starting sheet having a plurality of spaced holes therein.

14. The civil engineering reinforcing structure of claim 11, wherein the strands or ribs in the array extending in the first direction are essentially perpendicular to the strands or ribs in the array extending in the second direction to form 35 generally rectangular apertures or openings.

15. The civil engineering reinforcing structure of claim 14, wherein the aspect ratio is in a range between greater than 1.0 and about 4.0.

16. The civil engineering reinforcing structure of claim 11, wherein the geogrid has a third array of oriented strands or ribs intersecting each other at junctions such that the angles of the intersecting strands or ribs of the three arrays at the junctions are angles not equal to 90°.

17. The civil engineering reinforcing structure of claim 16, wherein the angles of the intersecting strands or ribs are about 60° to form generally equilateral triangular apertures or openings.

18. The civil engineering reinforcing structure of claim 11, wherein the geogrid has triangular apertures or openings, and wherein said aspect ratio is between greater than 1.0 and about 2.5.

19. The civil engineering reinforcing structure of claim 11, wherein the strands or ribs have a concave cross-section at or near a center thereof.

20. The civil engineering reinforcing structure of claim 11, wherein said molecularly oriented strands or ribs in the second direction have an aspect ratio at a longitudinal midpoint of said molecularly oriented strands or ribs which is greater than 1.0 in the completed geogrid.

21. The civil engineering reinforcing structure of claim 11, wherein a material composition of the strands in the first array of the completed geogrid is the same as a material composition of the strands in the second array of the completed geogrid.

* * * * *

UNITED STATES PATENT AND TRADEMARK OFFICE
CERTIFICATE OF CORRECTION

PATENT NO. : 11,149,386 B2
APPLICATION NO. : 16/668067
DATED : October 19, 2021
INVENTOR(S) : Anthony T. Walsh It is certified that error appears in the above-identified patent and that said Letters Patent is hereby corrected as shown below:

In the Claims

In Claim 14:
Please change: "The civil engineering reinforcing structure of claim 11, wherein the strands or ribs in the array extending in the first direction are essentially perpendicular to the strands or ribs in the array extending in the second direction to form 35 generally rectangular apertures or openings."
To:
-- The civil engineering reinforcing structure of claim 11, wherein the strands or ribs in the array extending in the first direction are essentially perpendicular to the strands or ribs in the array extending in the second direction to form generally rectangular apertures or openings. --

Signed and Sealed this
Thirteenth Day of June, 2023

*Katherine Kelly Vidal*

Katherine Kelly Vidal
*Director of the United States Patent and Trademark Office*